Figure 3:
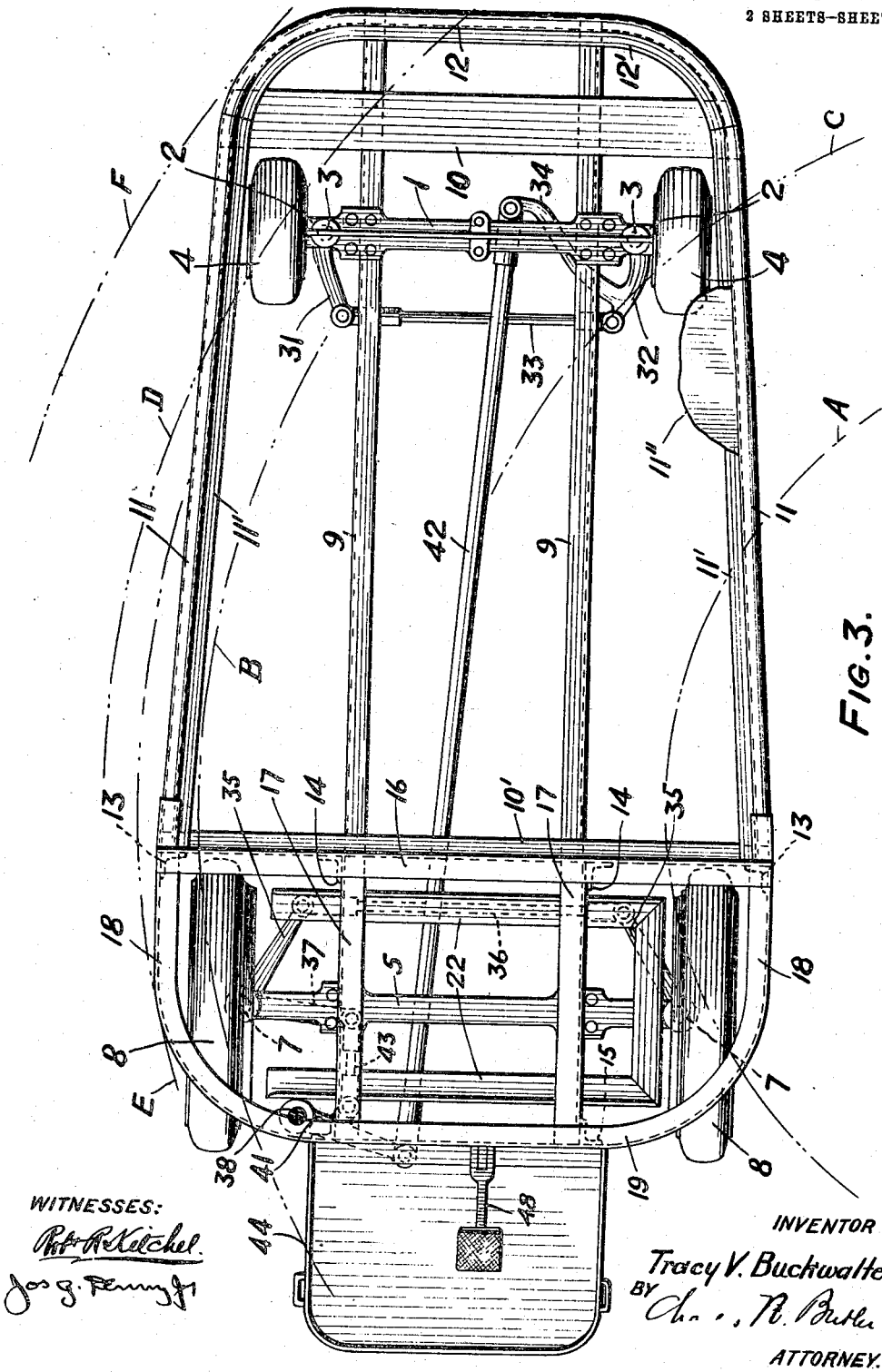

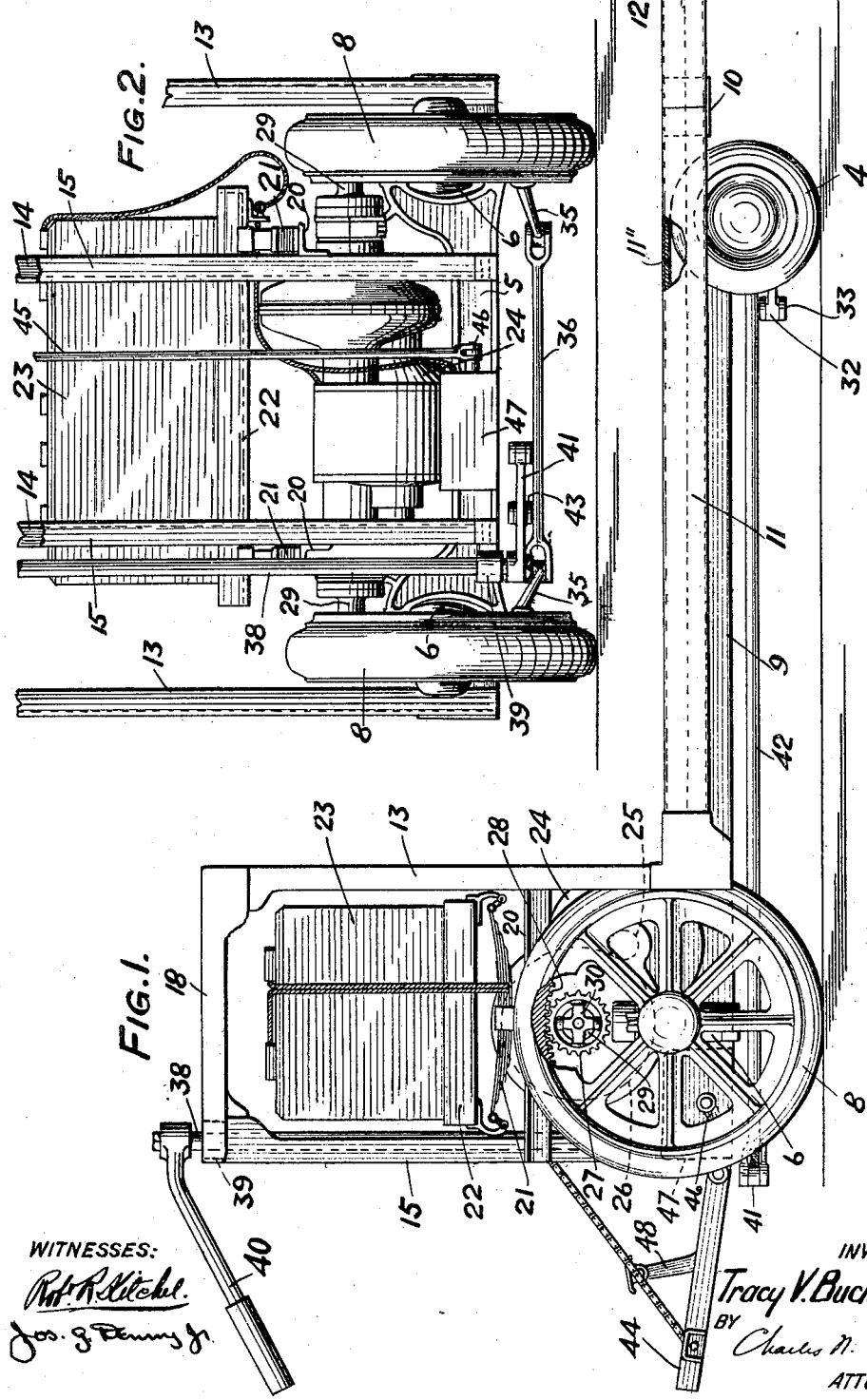

T. V. BUCKWALTER.
BAGGAGE TRUCK.
APPLICATION FILED JULY 6, 1910.

1,072,817.

Patented Sept. 9, 1913.

2 SHEETS—SHEET 2.

WITNESSES:

INVENTOR
Tracy V. Buckwalter
BY
ATTORNEY.

UNITED STATES PATENT OFFICE.

TRACY V. BUCKWALTER, OF ALTOONA, PENNSYLVANIA.

BAGGAGE-TRUCK.

1,072,817. Specification of Letters Patent. Patented Sept. 9, 1913.

Application filed July 6, 1910. Serial No. 570,554.

*To all whom it may concern:*

Be it known that I, TRACY V. BUCK-WALTER, a citizen of the United States, residing at Altoona, in the county of Blair and State of Pennsylvania, have invented certain Improvements in Trucks, of which the following is a specification.

My invention is a truck operated by a motor, and it comprises a frame having housed at one end a pair of traction wheels with vertical axes of oscillation and at the other end an elevated housing containing a battery, a motor, and driven traction wheels having vertical axes of oscillation, in combination with mechanism for turning the wheels on their vertical axes simultaneously.

The object of my invention is to facilitate the handling of baggage, freight and the like by improving the form, structure and mode of operation of existing mechanisms, with a view to obtaining compactness and large capacity, convenience in loading and unloading, and facility in steering and operating generally.

In the accompanying drawings, Figure 1 is a side elevation of a truck embodying my improvements; Fig. 2 is an end elevation of the same with parts broken away, and Fig. 3 is a plan view with parts removed.

The truck, as shown in the drawings, is provided at one end with the axle 1 having the knuckles 2 connected therewith by the journals 3 and the low wheels 4 journaled on the knuckles. At the other end, the truck is provided with the axle 5 having the knuckles 6 connected therewith by the journals 7 and the comparatively high wheels 8 journaled on the knuckles, the wheels 8 having a wider gage or tread than the wheels 4. Longitudinal beams 9 are supported by the axles and support the transverse beams 10 and 10'. A U-shaped beam, comprising the diverging side sections 11 and the end section 12, is supported by the beams 9, 10 and 10', and is provided with the flanges 11' and 12' for supporting a floor or platform 11''. Struts 13 are connected with and supported by the connected ends of parts 10' and 11; struts 14 are connected with and supported by the beams 9 and 10' at their junctures, and struts 15 are supported by ends of the beams 9. A transverse beam 16 is fixed to the tops of the struts 13 and 14, longitudinal beams 17 are fixed to the tops of the struts 14 and 15, and a U-shaped beam consisting of the converging side sections 18 and the end section 19 is fixed to the tops of the struts 13 and 15; these beams being adapted for holding a floor or platform. Beams 20, fixed to the struts 14 and 15, support the springs 21 which carry the cradle 22 for holding the battery 23, the cradle being adapted for having the battery slid thereinto and therefrom through the end of the housing formed by the parts 13 to 19 inclusive.

A motor 24, adapted to be operated by the battery, is supported by the frame within the housing and acts through the gears 25, 26, 27 and 28, upon the wheels 8, to which the gears 28 are fixed; the gears 27 being connected with the driving shaft 29 (through which the gears 26 act) by the universal joints 30 in the line of the axes of the journals 7.

The knuckles 2 have fixed thereto the arms 31 and 32 which are connected by the rod 33, the arm 32 having an arm 34 fixed thereto through which the wheels are moved on their vertical axes. Similarly the knuckles 6 have fixed thereto the arms 35 connected by a rod 36, one of the knuckles having an arm 37 fixed thereto through which these knuckles are moved on their vertical axes. A shaft 38, journaled in the bearings 39 on the housing and turned by the lever 40, has an arm 41 fixed thereto which is connected by the rod 42 with the arm 34 and by the link 43 with the arm 37, whereby the wheels are all shifted simultaneously on their vertical axes to steer the truck.

A folding platform 44, adjacent to the motor housing, serves to carry the operator who is enabled by the arrangement to operate not only the steering lever 40; but also the parts 45 and 46 for operating the controller 47 which is disposed in the housing, and further the foot lever 48 for operating the brake mechanism which is likewise within the housing.

The front or driving wheels 8 have a turning angle of approximately 25 degrees, limited by the character of the connections of the universal pinions, and the steering gear is arranged so that the traction wheels describe circles which are substantially concentric. The rearwardly converging sides of the frame and the rounded corners are designed for enabling the truck to be turned within a small radius. In turning, the inner driving wheel will describe the circle A while the outer wheel will turn at an angle not quite so acute, describing the circle B. The turning angle of the rear wheels 4 is not limited by driving conditions and they are therefore designed so that the inner wheel, describing the circle C, will turn through an angle of 45 degrees, while the outer wheel, turns through a somewhat smaller angle, describing circle D of maximum radius. It will be evident that the narrower the rear of the platform and the tread of the rear wheels, the smaller will be the area within which the truck can be turned, to which end the corners of the frame are rounded and, in turning, describe the circles E and F. The truck being intended for warehouse use and operation in box cars, the construction is designed to provide for turning within a small radius and to be skidded by contact of the rounded corners with an obstruction.

Having described my invention, I claim:

1. A tapering drop frame having an elevated part, in combination with wheels of different diameters and different treads within its sides at its opposite ends, the wheels of greater diameter and greater tread being under said elevated part.

2. A tapering drop frame elevated at its wider end and rounded at the corners of its narrower end, wheels within the sides of the wider end of said frame, wheels of smaller diameter and narrower tread within the sides of the narrower end of said frame, and means comprising knuckles whereby said wheels support said frame.

3. A tapering drop frame, wheels within the sides of the wider end of said frame, wheels of narrower tread within the sides of the narrower end of said frame, means comprising knuckles whereby said wheels support said frame, and means for shifting said wheels so that they describe approximately concentric circles.

4. A tapering drop frame elevated at its wider end and having rounded corners at its narrower end, a pair of wheels at the wider and elevated end of said frame, a pair of wheels of smaller diameter and narrower tread at the narrower end of said frame, means whereby said wheels support said frame and means for simultaneously shifting said wheels so that they describe approximately concentric circles.

In witness whereof I have hereunto set my name this 2d day of July, 1910, in the presence of the subscribing witnesses.

TRACY V. BUCKWALTER.

Witnesses:
P. H. MARKLEY,
E. R. ALE.